United States Patent Office 3,493,649
Patented Feb. 3, 1970

3,493,649
ANALGESIC-ANTI-INFLAMMATORY DRUG BASED ON A TETRAHYDROINDAZOLE DERIVATIVE
Gian Giacomo Massaroli, Milan, Italy, assignor to Polichimica Sap S.p.A., Milan, Italy
No Drawing. Filed July 24, 1967, Ser. No. 655,344
Claims priority, application Italy, July 4, 1967, 17,994/67
Int. Cl. A61k 7/16
U.S. Cl. 424—56     27 Claims

ABSTRACT OF THE DISCLOSURE 2-methyl - 3 - methylamino-4,5,6,7-tetrahydro-indazole and salts thereof with mineral or organic acids, useful for the treatment of diseases of an inflammatory and/or painful nature administrable orally, via the rectum or by parenteral means, as well as in an ointment or dentifrice.

---

The present drug comprises as the active substance a new compound constituted of the 2-methyl-3-methylamino - 1,2,3,4 - tetrahydroindazole ("Poli 67") of the formula:

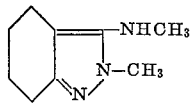

and the salts thereof with mineral or organic acids.

2-methyl-3-methylamino-1,2,3,4-tetrahydroindazole, the empiric formula of which is $C_9H_{15}N_3$, is a white, very soft product very soluble in water and in most of the polar and non-polar organic solvents; it may be distilled under reduced pressure without decomposition and crystallized from di-isopropyl ether. B.P. 115°–125° C./0.05–0.1 torr. M.P. 92°–93° C. 2-methyl-3-methylamino-1,2,3,4-tetrahydroindazole may be easily salified with organic or mineral acids.

In particular the maleate having empiric formula $C_9H_{15}N_3 \cdot C_4H_4O_4$ occurs as a white-yellowish crystalline substance, soluble in water, crystallizable from methanol, ethanol, or acetone and substantially insoluble in non-polar solvents. M.P. 150°–153° C.

To prepare 2-methyl-3-methylamino-1,2,3,4-tetrahydro indazole, the following synthesis scheme is utilized:

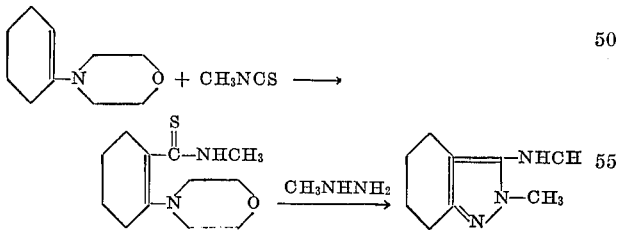

(1) In a flask of 500 ml. fitted with a cooler protected from air humidity by means of a $CaCl_2$ tube, 89.7 g. (1.225 moles) methylisothiocyanate and 186 g. (1.115 moles) of 1-morpholinocyclohexene-1 are introduced. The mixture is heated for 6 hours on water bath at 75°–85° C., then it is diluted with 250 ml. isopropyl ether and vigorously stirred simultaneously cooling. The oily suspension solidifies within a short time giving rise to a yellow substance which is allowed to stand overnight, filtered off and washed with isopropyl ether.

In this way 240 g. (yield 90%) of 1-morpholino-2-thiocarbomethylamino-1-cyclohexene are obtained which when recrystallized from methanol melts at 81°–83° C.

(2) 50.6 g. (1.1 moles) methylhydrazine dissolved in 100 ml. absolute ethanol are added by dropping in about 30 minutes to a stirred mixture of 240 g. (1 mole) of raw 1-morpholino-2-thiocarbomethylamino-1-cyclohexene, 350 ml. absolute ethanol and 120 g. (2 moles) acetic acid, keeping the temperature below 35° C.

At the end of the addition, the gaseous development tendency to diminish is awaited and thereafter, it is heated to boiling for 3 hours. Most of the solvent is evaporated under vacuum, the residue is diluted with 1.5 liters water, 80 g. tartaric acid are added, charcoal is added, it is stirred a long time, filtered, concentrated under vacuum to ⅓ of the original volume, oversaturated with solid potassium carbonate and extracted with benzene. The benzene extract is dried on sodium sulfate and evaporated under vacuum. It is distilled by collecting at 115°–125° C./0.05–1 torr. The distillate is crystallized from isopropyl alcohol and melts at 92°–93° C.

Pharmacological and toxicological characteristics of "Poli 67"

(a) The acute toxicity of "Poli 67" in a mouse and a rat given in different administration ways, is indicated in Table I in comparison with phenylbutazone and aminopyrine.

TABLE 1

| Substance | Mouse (LD₅₀ mg./kg.) | | | Rat (LD₅₀ mg./kg.) | |
|---|---|---|---|---|---|
|  | os | e.p. | ev. | os | e.p. |
| "Poli 67" | 630 | 325 | 125 | 1,850 | 337 |
| Phenylbutazone | 880 | 300 | 150 | 1,125 | 312 |
| Aminopyrine | 700 | 272 | 137 | 1,900 | 237 |

Chronic toxicity of "Poli 67" has been investigated in rats and dogs. The rat was treated daily orally for 105 days with doses of 10, 20 and 50 mg./kg.

TABLE 2.—MORTALITY OF RATS TREATED DAILY ORALLY WITH "POLI 67"

| Substance | Doses, mg./kg./24 hours os | Initial number of animals | | | No. of animals after 105 days | | |
|---|---|---|---|---|---|---|---|
|  |  | M | F | Total | M | F | Total |
| Control |  | 10 | 10 | 20 | 5 | 10 | 15 |
| Var., percent |  |  |  |  | −50 |  | −25 |
| POLI 67 | 10 | 5 | 5 | 10 | 5 | 5 | 10 |
| Var., percent |  |  |  |  |  |  |  |
| Poli 67 | 20 | 10 | 10 | 20 | 6 | 7 | 13 |
| Var., percent |  |  |  |  | −40 | −30 | −35 |
| Poli 67 | 50 | 5 | 5 | 10 | 1 | 5 | 6 |
| Var., percent |  |  |  |  | −80 |  | −40 |

The following parameters were taken into examination: ponderal increase curve, food consumption, hematic crasis, general behaviour, and weight of the most important organs taken out at the end of the experiment.

"Poli 67" did not evidence sgnificant toxic effects in rats, up to the doses of 20 mg./kg.

Dogs were treated orally for 180 days with doses of 4 and 20 mg./kg./24 hours,

TABLE 3.—MORTALITY OF DOGS TREATED DAILY ORALLY WITH "POLI 67"

| Substance | Doses, mg./kg./24 hours os | Initial No. animals | | | No. animals after 180 days | | |
|---|---|---|---|---|---|---|---|
| | | M | F | Total | M | F | Total |
| Control | | | 2 | 2 | | 2 | 2 |
| "Poli 67" | 4 | | 2 | 2 | | 2 | 2 |
| "Poli 67" | 20 | 1 | 1 | 2 | 1 | 1 | 2 |

The following parameters were taken into examination: weigh increase curve, hematic crasis, functional tests (hepatic function, renal function), azotemia, glycemia, weight of the most important organs taken out at the end of the test, and general behavioaur).

"Poli 67" did not evidence significant toxic effects with either of the doses used.

(b) Teratogenic activity

Eventual teratogenic activity of "Poli 67" was investigated in mice, rats and rabbits.

Treatment was carried out from the 8th to 16th day of pregnancy in rats and rabbits, and from the 2nd to 20th day in mice.

The doses used were 20 and 50 bg./kg. in mice, and 50 and 100 mg./kg. in rats and rabbits.

Female mice and rats were allowed to give birth, whereas in female rabbits, the fetus was withdrawn by means of a laparatomy, one day before the presumed bitrh.

The dose of 100 mg./kg. displayed toxic effects on the mother rabbit, however, not causing any undesirable effects on the fetus.

With all other doses and in all three of the animals tested, "Poli 67" did not provoke any teratogenic effects of any kind.

(c) Analgesic activity

"Poli 67" analgesic activity was investigated on three types of pain:

(a) non-inflammatory pain (Bianchi and Franceschini test)
(b) inflammatory pain (Randal and Selitto test)
(c) pain of direct stimulation of nerve terminals (Siegmund test).

"Poli 67" proved to be moderately active in the cases of pain induced in normal tissues, very active (distinctly superior to aminopyrine and phenylbutazone) in cases of pain induced in inflamed tissues, and endowed with activity like that displayed by aminopyrine and more than that of phenylbutazone, on cases of pain from direct stimulation of nerve endings.

The activity outline resulting from these three pains allows the exclusion immediately of a central narcotic-stupefying component (morphine-like) for "Poli 67," while, relegating rather, the new compound to the series of peripheral analgesics with an action mechanism similar to the that of acetylsalicylic acid.

Absence of a central depressing or stupefying component of "Poli 67" is confirmed also by the fact that it does not cause phenomena of abstinence, does not interfere with barbiturics and does not modify the degree of motory co-ordination of the animal or its capacity to adjust the postural tonus.

(d) Anti-inflammatory actiivty

"Poli 67" anti-inflammatory activity has been investigated either in the acute inflammatory process (edemaperitonitis) or in the chronic type (granuloma).

Investigation has been, monreover, performed in order to see whether the anti-phlogistic activity of the compound was displayed beyond the influence of the hypothysls-adrenal axis, by using for this purpose suprarenalectomized animals.

The anti-inflammatory activity of "Poli 67" has proved to be almost identical to that of phenylbutazone and extremely superior to that of aminopyrine. This property thereof is displayed to an equal degree also in the suprarenalectomized rats.

(c) Further activities on CNS (1) Barbiturate sleep.—"Poli 67" used in doses up to 150 mg./kg. os does not interact with sodium pentabarbital, since it does not change the duration of narcosis, induced by the barbiturate in rats.

(2) Rotating pole test.—To doses of 200 mg./kg. "Poli 67" did not cause changes of the motor co-ordination in rats.

(3) Abstinence phenomena.—No abstinence phenomena were noticed in rats and dogs treated for a long time with "Poli 67" to doses of 50 mg./kg. os.

(f) Spasmolytic activity

"Poli 67" has exhibited an interesting spasmolytic activity "in vivo" on smooth intestinal musculature (like that displayed by aminopyrine).

(g) Activity on circulation (1) Rabbits.—Up to the doses of 10 mg./kg. e.v. "Poli 67" does not cause significant changes either of the arterial pressure or of the respiration.

(2) Cats under narcosis.—At doses of 20 mg./kg. e.v. "Poli 67" has caused a fleeting hypotension of 40 mm. Hg while increasing the amplitude of the respiration and not modifying significantly all the further parameters taken into consideration (hypotension by acetylcholine and by stimulation of the peripheric vagus, hypertension by adrenalin).

(3) Dogs under narcosis.—To doses of 5 mg./kg. e.v. "Poli 67" does not modify significantly either the arterial pressure or the cardiac contractile power.

Clinical experimentation

Anatomic substrate of infective diseases or of the ones on merely phlogistic base is identical, that is, the injured tissue or organ goes toward a complex of non-specific and common phenomena such as active hyperemia, edema with consequent pain, hyperthermia, namely to that complex of phenomena that constitute the mesenchyma activation.

This is the reason why both one or the other diseases are basically treated with drugs whose main feature is the capacity to dominate the mesenchyma reaction.

Obviously, in infective disease, to antireactionals are associated the specific chemiotherapeutic or antibiotic agents against the infectant agent, while in the phlogistic diseases, with high hyperthermic component to the antireactionals, are associated the antipyretics having an immediate effect.

Typical examples of this way of conceiving therapy are the associations of cortisones with antibiotics in infective diseases, and the associations of phenylbutazone and derivatives with aminopyrine and derivatives in the treatment of hyperpyretic acute rheumatic forms.

Both steroidal antireactional drugs and the synthesis anti-inflammatory non-steroidal drugs with non-central component show, however, some limitations in their use connected either to collateral biological activities or with long-term toxic properties.

Hence the research of ever new molecules having mesenchyma antireactive action, even better if displaying simultaneously an antalgic activity having rapid effect.

"Poli 67" belongs just to this latter category of drugs, and it is an original, new synthetic drug made in the research laboratories of Polichimica SAP, and is an anti-inflammatory analgesic drug with notable activity index.

Experimentation has been carried out in many Italian clinics both in the hospital and in the university fields.

It has been attempted to investigate in all the fields of pathology where it would be important to fight against a phlogistic component to obtain an antalgic effect.

The recommended dosage was of 150–300 mg./day given either orally or parenterally, by making administrations in fractions of time.

In internal medicine, for instance, "Poli 67" was thus employed in acute and chronic rheumatic disease, either alone or associated with sodium noramidopyrine methane sulfonate or with acetylsalicylic acid, in the acute diseases of bacterial genesis, in association with specific chemiotherapeutical or antibiotic agents.

In surgery and traumatology, the analgesic antiphlogistic action of "Poli 67" has been profitably used in phlebitis, in surgical wounds, with outstanding inflammatory component, in sprains, in bone and muscular traumatisms, also administering it as an ointment.

Also in obstetrics Poli 67 has been prescribed, with or without being associated with antibiotics, in annexed inflammatory forms depending on the nature of the phlogosis; in otology in the media otitis, in the phlogosis of the Eustachian tube, in laryngotracheitis, in bronchitis. In these latter cases, it is used also as a syrup together with bechic or antibiotic drugs. In stomatology, it is used, as a gengiva antiphlogistic, and also as a dentifrice.

On the other hand, the initially cited reasons for the importance of antiphlogistic drugs in the present vision of an optimal therapeutical behaviour make 'Poli 67" a product of outstanding importance in a very high number of diseases, so that what has been set forth above has to be considered as being only an exemplification.

The clinical results obtained have confirmed the therapeutical validity of "Poli 67" in the sense that in a high percentage of the patients treated, more than 70–75% have seen the phlogistic component of the disease wherefrom they suffered to be clinically decreased, in addition to the remission of the painful symptomatology whenever present.

As regards tolerance, they may be undoubtedly defined good, as the scarce negative collateral phenomena are limited to digestive trouble or moderate pyrosis.

Parenterally, the product does not cause infiltrations, even after repeated administrations. Given either orally or parenterally, no phenomena of general intolerance have been noticed up to now.

For oral administration, tablets, capsules or sugar-coated pills have been utilized, containing 50 and 100 mg. 3-methylamino-2-methyl-4,5,6,7,-tetrahydroindazole or a stoichiometrically corresponding amount of product obtained by salifying the above cited compound with a nontoxic organic or inorganic acid. In particular, the acidic maleate of the above named compound has been often used in amounts corresponding to 50 or 100 mg. of base.

In the above cited pharmaceutical forms the active substance was mixed with the normal excipients (starch, talc, magnesium stearate, sucrose and so on) occasionally with the addition of substances endowed with anti-acid power such as aluminum hydroxide, magnesium trisilicate or licorice dry extract.

The composition of a few pharmaceutical forms that can be used for oral administration are as follows:

(1) Oral tablets: Mg.
    3-methylamine-2-methyl - 4,5,6,7 - tetrahydro indazole _____ 50
    Starch _____ 200
    Talc _____ 10
    Magnesium stearate _____ 5

(2) Oral tablets:
    3-methylamino-2-methyl - 4,5,6,7 - tetrahydro indazole maleate _____ 100
    Starch _____ 250
    Talc _____ 10
    Magnesium stearate _____ 5

(3) Oral capsules:
    3-methylamino-2-methyl - 4,5,6,7 - tetrahydro indazole _____ 100
    Lactose _____ 200
    Magnesium stearate _____ 10

(4) Solution sweetened to 0.5%:
    2 - methyl - 3 - methylamino - 1,2,3,4-tetrahydro indazole _____ g__ 0.500
    Sucrose _____ g__ 20
    Glycerol _____ g__ 10
    Methyl p-hydroxy benzoate _____ g__ 0.1
    Distilled water q.s. to _____ ml__ 100

(5) Oral sugar-coated pills in association with Noramidopyrine methanesulfonate sodium:
    2 - methyl - 3 - methylamino - 1,2,3,4 - tetrahydro indazole _____ mg__ 50
    Noramidopyrine methanesulfonate sodium _____ mg__ 250
    Starch, talc, magnesium stearate, sucrose, q.s. to _____ mg__ 600

(6) Oral sugar-coated pills in association with acetylsalicylic acid:
    2 - methyl - 3 - methylamino - 1,2,3,4 - tetrahydro indazole _____ mg__ 50
    Acetyl salicyclic acid _____ mg__ 250
    Starch, talc, magnesium, stearate, sucrose, q.s. to _____ mg__ 600

(7) Oral sugar-coated pills in association with tetracycline:
    2 - methyl - 3 - methylamino - 1,2,3,4 - tetrahydro indazole _____ mg__ 100
    Tetracycline hydrochloride _____ mg__ 250
    Starch, talc, magnesium, stearate, sucrose, q.s. to _____ mg__ 600

(8) Oral suspension is association with tetracycline:
    2 - methyl - 3 - methylamino - 4,5,6,7 - tetrahydro indazole _____ g__ 0.250
    Anphoteric tetracycline _____ g__ 0.750
    Carboxy methyl cellulose _____ g__ 1
    Sucrose _____ g__ 20
    Distilled water q.s. to _____ ml__ 100

(9) Cough syrup:
    2 - methyl - 3 - methylamino - 4,5,6,7 - tetrahydro indazole _____ g__ 0.250
    Ammonium acetate _____ g__ 1.000
    Sodium timosulfonate _____ g__ 0.600
    Codeine _____ g__ 0.100
    Ephedrine _____ g__ 0.100
    Syrup of aromatized sugar q.s. to _____ g__ 100

(10) Syrup with chloramphenicol:
    2 - methyl - 3 - methylamino - 4,5,6,7 - tetrahydro indazole _____ g__ 0.250
    Chloramphenicol palmitate _____ g__ 5.000
    Ethylene glycol _____ g__ 20.000
    Polysorbate 80 _____ g__ 4.000
    Water q.s. to _____ g__ 100

(11) Cough syrup with chloramphenicol:
  2 - methyl - 3 - methylamino - 4,5,6,7 - tetra-
    hydro indazole _____ g__ 0.250
  Chloramphenicol palmitate _____ g__ 5.000
  Codeine _____ g__ 0.100
  Ephedrine _____ g__ 0.100
  Ethylene glycol _____ g__ 20.000
  Polysorbate 80 _____ g__ 4.000
  Water q.s. to _____ ml__ 100

(12) Dentifrice with anti-inflammatory action on the gengives:
  2 - methyl - 3 - methylamino - 4,5,6,7 - tetra-
    hydro indazole _____ g__ 1.000
  Bicalcium phosphate _____ g__ 50.000
  Sodium lauryl sulfate _____ g__ 2.000
  Sorbitol _____ g__ 20.000
  Saccharine _____ g__ 0.100
  Water _____ g__ 25.900
  Flavors _____ g__ 1.000

(13) 5% antiphlogistic ointment:
  2 - methyl - 3 - methylamino - 4,5,6,7 - tetra-
    hydro indazole _____ g__ 5.000
  Polyglycol 300 _____ g__ 70.000
  Polyglycol 4000 _____ g__ 25.000

(14) Suppositories:
  2 - methyl - 3 - methylamino - 4,5,6,7 - tetrahy-
    dro indazole _____ g__ 0.150
  Fatty excipient _____ g__ 2.800

(15) Suppositories:
  2-methyl - 3 - methylamino-4,5,6,7-tetrahydro
    indazole _____ g__ 0.100
  Noramidopyrine methansulfonate sodium _g__ 1.000
  Fatty excipient q.s. to _____ g__ 3.000

(16) Suppositories with chloramphenicol and bismuth:
  2-methyl-3-methylamino-4,5,6,7-tetrahydro in-
    dazole _____ g__ 0.150
  Chloramphenicol _____ g__ 0.200
  Bismuth camphocarbonate _____ g__ 0.030

(17) Phials:
  2-methyl - 3 - methylamino-4,5,6,7-tetrahydro
    indazole _____ g__ 0.100
  Lidocaine-HCl _____ g__ 0.025
  Distilled water q.s. to _____ ml__ 3

(18) Phials:
  2-methyl-3-methylamino-4,5,6,7-tetrahydro in-
    dazole _____ g__ 0.050
  Vitamin $B_1$-HCl _____ g__ 0.050
  Vitamin $B_{12}$ _____ mcg__ 500
  Lidocaine-HCl _____ g__ 0.025
  Distilled water q.s. to _____ ml__ 2

(19) Phials:
  2-methyl-3-methylamino-4,5,6,7-tetrahydro in-
    dazole _____ g__ 0.100
  Noramidopyrine methanolsulfonate sodium
                                          g__ 1.000
  Distilled water q.s. to _____ ml__ 3

What is claimed is:

1. A drug composition for the treatment of diseases accompanied by inflammation or pain which comprises (a) a therapeutically effective amount of 2-methyl-3-methylamino-4,5,6,7-tetrahydro indazole or a non-toxic acid addition salt thereof and (b) a carrier therefor.

2. A drug composition according to claim 1 in a form for oral, parenteral or rectal administration.

3. A drug composition according to claim 2 in the form of an oral tablet containing about 0.050 g. to about 0.150 g. of component (a).

4. A drug composition according to claim 3 in the form of an oral tablet containing about 0.050 g. of component (a) in association with starch, talc and magnesium stearate.

5. A drug composition according to claim 2 in the form of an oral tablet containing about 0.050 g. to about 0.150 g. of component (a) in association with about 0.250 g. to about 0.500 g. sodium noramidopyrine methanesulfonate.

6. A drug composition according to claim 5 in the form of an oral sugar-coated pill containing about 0.050 g. of component (a) in association with about 0.250 g. sodium noramidopyrine methanesulfonate and starch, talc, magnesium stearate and sucrose.

7. A drug composition according to claim 2 in the form of an oral sugar-coated pill containing about 0.050 g. to about 0.150 g. of component (a) in association with about 0.200 g. to about 0.500 g. acetylsalicylic acid.

8. A drug composition according to claim 7 in the form of an oral sugar-coated pill containing about 0.050 g. of component (a) in association with about 0.250 g. of acetylsalicylic acid and starch, talc, magnesium stearate and sucrose.

9. A drug composition according to claim 2 in the form of an oral sugar-coated pill containing about 0.050 g. to about 0.150 g. of component (a) in association with about 0.100 g. to about 0.500 g. amphoteric tetracycline or tetracycline hydrochloride.

10. A drug composition according to claim 9 in the form of an oral sugar-coated pill containing about 0.100 g. of component (a) in association with about 0.250 g. tetracycline hydrochloride and starch, talc, magnesium stearate and sucrose.

11. A drug composition according to claim 1 in the form of a solution for oral use containing about 0.1% to about 0.2% of component (a).

12. A drug composition according to claim 11 in the form of an aqueous solution for oral use containing about 0.5% of component (a).

13. A drug composition according to claim 11 in the form of an aqueous solution containing about 0.25% of component (a) in association with about 0.75% of amphoteric tetracycline.

14. A drug composition according to claim 11 in the form of an aqueous vehicle containing about 0.25% of component (a) in association with about 5% of chloramphenicol palmitate.

15. A drug composition according to claim 1 in the form of a liquid dentifrice, tooth-paste, or tooth-powder containing about 0.1% to about 3% of component (a).

16. A drug composition according to claim 15 in the form of tooth-paste containing about 1% of component (a) in association with di-calcium phosphate, sodium lauryl sulfate, sorbitol and saccharine.

17. A drug composition according to claim 1 in the form of an ointment or promade for topical use containing about 1% to about 5% of component (a).

18. A drug composition according to claim 17 in the form of an ointment for topical use containing about 5% of component (a).

19. A drug composition according to claim 1 in the form of a rectal suppository containing about 0.050 g. to about 0.250 g. of component (a) in association with about 0.250 g. to about 1.000 g. sodium noramidopyrine methanesulfonate.

20. A drug composition according to claim 19 in the form of a rectal suppository containing about 0.150 g. of component (a).

21. A drug composition according to claim 19 in the form of a rectal suppository containing about 0.100 g. of component (a) in association with about 1 g. sodium noramidopyrine methansulfonate.

22. A drug composition according to claim 2 in the form of a rectal suppository containing about 0.050 g. to about 0.250 g. of component (a) in association with about 0.100 g. to about 0.300 g. chloramphenicol and about 0.010 g. to about 0.050 g. bismuth camphocarbonate.

23. A drug composition according to claim 22 in the form of a rectal suppository containing about 0.150 g. of component (a) in association with about 0.200 g. chloramphenicol and about 0.030 g. bismuth camphocarbonate.

24. A drug composition according to claim 1 in the form of an aqueous solution for parenteral use containing about 0.050 g. to about 0.500 g. of component (a) in association with vitamin $B_1$, vitamin $B_{12}$ or sodium noramidophrine methanesulfonate.

25. A drug composition according to claim 24 in the form of a phial for parenteral use containing 0.100 g. of component (a) and 0.025 g. of lidocaine-HCl in about 3 ml. of water.

26. A drug composition according to claim 24 in the form of a phial for parenteral use containing 0.050 g. of component (a) with 0.050 g. vitamin $B_1$-HCl, with 500 mcg. vitamin $B_{12}$ and with 0.025 g. lidocaine-HCl in about 2 ml. of water.

27. A drug composition according to claim 24 in the form of a phial for parenteral use containing 0.100 g. of component (a) in association with about 1.000 g. sodium noramidopyrine methanesulfonate in 3 ml. of an aqueous vehicle.

References Cited

Farbenfabriken Bayer, Chem. Abst., vol. 60, col. 6957 (1964).

ALBERT T. MEYERS, Primary Examiner

STANLEY J. FRIEDMAN, Assistant Examiner

U.S. Cl. X.R.

260—310; 424—201, 227, 230, 255, 273, 296, 324